United States Patent Office 3,759,855
Patented Sept. 18, 1973

3,759,855
POLYESTERS HAVING IMPROVED STRETCH-
ABILITY AND DYEABILITY PROPERTIES
Robert Schnegg, Herbert Pelousek, and Robert Dippel-
hofer, Dormagen, Germany, assignors to Bayer Aktien-
gesellschaft, Leverkusen, Germany
No Drawing. Filed Apr. 15, 1971, Ser. No. 134,481
Claims priority, application Germany, Apr. 22, 1970,
P 20 19 429.0
Int. Cl. C08g 17/16
U.S. Cl. 260—22 R  5 Claims

ABSTRACT OF THE DISCLOSURE

Improved stretchability and dyeability properties are shown by novel terephthalic acid polyesters having melt viscosities of from 500 to 20,000 poises at 280° C., and comprising recurring alkylene diol terephthalate units, and of 0.02 to 12 mol percent of units containing polyol radicals that are partially esterified with fatty acids, and corresponding to the general formula

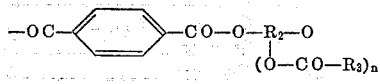

in which $R_2$ represents a linear or branched aliphatic or hydroaromatic radical having a functionality of $2+n$, $R_3$ represents hydrogen or a $C_1$–$C_{19}$ alkyl radical, and $n$ represents an integer from 1 to 6.

---

This invention relates to high molecular weight, linear terephthalic acid polyesters having melt viscosities of from 500 to 20,000 poises at 280° C. and to a process for the production thereof.

It is known that terephthalic acid polyesters into which polyfunctional compounds, more particularly aliphatic polyhydroxy compounds, for example glycerol, trimethylol propane or pentaerythritol, have been introduced by condensation, provide improvements in some of the material properties of articles produced from them. Unfortunately, all additives of this kind have the serious disadvantage that they lead to crosslinked products which exhibit deterioration in essential properties, for example in the stretchability of spun filaments.

It has now surprisingly been found that improved stretchability and dyeability properties are shown by novel terephthalic acid polyesters having melt viscosities of from 500 to 20,000 poises at 280° C., and comprising recurring alkylene diol terephthalate units corresponding to the general formula

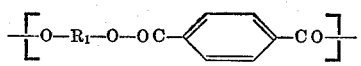

in which $R_1$ represents a $C_1$–$C_8$ alkylene radical, and of 0.02 to 12 mol percent of units containing polyol radicals that are partially esterified with fatty acids, and corresponding to the general formula

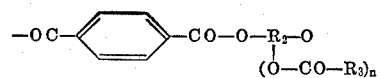

in which $R_2$ represents a linear or branched aliphatic or hydroaromatic radical having a functionality of $2+n$, $R_3$ represents hydrogen or a $C_1$–$C_{19}$ alkyl radical, and $n$ represents an integer from 1 to 6.

Compared with conventional terephthalic acid polyesters, the melt viscosity of the polyesters according to the invention shows an increase of some 3000 poises at temperatures of 280° C., even when the aforementioned polyol radical units partially esterified with fatty acids are present in quantities as small as from 0.02 to 12 mol percent.

The terephthalic acid polyesters according to the invention are produced, under the conventional reaction conditions, by polycondensing terephthalic acid or an ester-forming derivative thereof with an aliphatic $C_1$–$C_8$ diol, following the addition of from 0.03 to 10% by weight, preferably from 0.03 to 1.0% by weight, of a polyol partially esterified with a fatty acid and having two free OH groups in the molecule, corresponding to the general formula

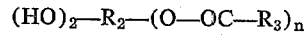

in which $R_2$ represents a linear or branched aliphatic or hydroaromatic radical having a functionality of $2+n$, $R_3$ represents hydrogen or a $C_1$–$C_{19}$ alkyl radical, and $n$ represents an integer from 1 to 6.

Examples of polyols partially esterified with fatty acids suitable for use in the process according to the invention include partial esters of glycerol, erythritol, pentaerythritol, pentitols, hexitols, heptitols or trimethylol cyclohexane. It is preferred to use glycerol monostearate, pentaerythritol distearate or trimethylol cyclohexane monostearate.

In addition to these polyols, which are only added in quantities of from 0.03 to 10% by weight, based on terephthalic acid, diols such as ethylene glycol, 1,3-propane diol, 1,4-butane diol, 1,6-hexane diol or cyclohexane dimethanol, are reacted in the usual way with terephthalic acid or its alkyl esters during the polycondensation reaction. For example, bis-2-hydroxyethyl terephthalate is initially prepared by transesterifying dimethyl terephthalate with ethylene glycol, or by esterifying terephthalic acid with ethylene glycol, in the presence of a catalyst such as zinc acetate, followed by polycondensation in the presence of a polycondensation catalyst such as antimony trioxide, cerium dioxide or germanium dioxide.

The terephthalic acid polyesters produced by the process according to the invention can be processed into high-strength filaments and fibres with improved antistatic properties.

The process according to the invention is illustrated by the following examples.

EXAMPLE 1

80 kg. of dimethyl terephthalate and 70 kg. of ethylene glycol are transesterified for 3 hours at 180° C. with 14.4 g. of zinc acetate (0.018% by weight). On completion of transesterification, 0.018% by weight of $GeO_2$ dissolved with 11.6 g. of sodium acetate in 1000 ml. of ethylene glycol, 0.072% by weight of triphenyl phosphite and 800 g. (1% by weight) of glycerol monostearate, are added to the reaction mixture, and the temperature is gradually raised to 285° C. followed by evacuation to 0.1 torr. After 3 hours, a high-viscosity polyester is obtained.

$\eta_{rel}$=1.64 (measured on a solution of 1 g. of polyester in 100 ml. of cresol at a temperature of 25° C.)
melt viscosity at 280° C.: 6180 poises
remission (460 mn.): 65.4%

EXAMPLES 2 TO 5

In Examples 2 to 5, only the additives and quantities are different, in other respects the procedure was as described in Example 1.

TABLE 1

| Ex. No. | Additive | Percent by weight | $\eta_{rel.}$ | Melt viscosity at 280° C. | Remission |
|---|---|---|---|---|---|
| 2 | Glycerol monostearate | 0.5 | 1.63 | 4,850 | 65.7 |
| 3 | Pentaerythritol distearate | 2.0 | 1.61 | 5,750 | 60.3 |
| 4 | Trimethylol cyclohexane monostearate | 2.5 | 1.60 | 4,300 | 62.8 |
| 5 | | | 1.61 | 3,500 | 54.8 |

Filaments produced from the terephthalic acid polyesters according to the invention show improved antistatic properties. This is demonstrated in Table 2 by measuring the surface resistance of poly-(ethylene glycol terephthalate) containing small quantities of the structural units defined above.

TABLE 2

| Polyester | Additive | Percent by weight | Surface resistance |
|---|---|---|---|
| 1. Poly-(ethyleneglycol terephthalate) | Pentaerythritol distearate | 0.3 | ⁷1.10 |
| 2. do | Glycerol monostearate | 1.0 | ⁶1.10 |
| 3. do | | | ¹³1.10 |

We claim:
1. A terephthalic acid polyester having a melt viscosity of from 500 to 20,000 poises at 280° C., comprising recurring alkylene diol terephthalate units of the general formula

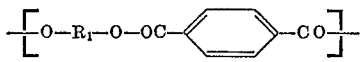

in which $R_1$ represents a $C_1$–$C_8$ alkylene radical, and of 0.02 to 12 mol percent based on the polyester, of units containing polyol radicals, partially esterified with fatty acids, corresponding to the general formula

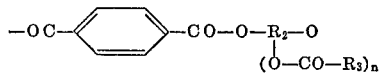

in which $R_2$ represents a linear or branched aliphatic or hydroaromatic radical having a functionality of $2+n$, $R_3$ represents hydrogen or a $C_1$–$C_{19}$ alkyl radical, and $n$ represents an integer from 1 to 6.

2. Filaments and fibers of the terephthalic acid polyester of claim 1.

3. The product as claimed in claim 1 wherein the partially esterified polyalcohol is glycerol monostearate.

4. The product as claimed in claim 1 wherein the partially esterified polyalcohol is pentaerythritol distearate.

5. The product as claimed in claim 1, wherein the partially esterified polyalcohol corresponds to the formula

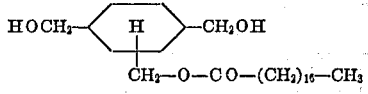

References Cited
UNITED STATES PATENTS

| | | | |
|---|---|---|---|
| 3,299,006 | 1/1967 | Tomiyama et al. | 260—75 |
| 2,702,257 | 2/1955 | Harmon | 117—138.8 |
| 3,041,318 | 6/1962 | Hess | 260—29.6 |
| 3,150,917 | 9/1964 | Gagliardi | 8—166 |
| 3,479,308 | 11/1969 | Gattenby et al. | 260—23 |
| 3,578,621 | 5/1971 | Stapfer | 260—31.6 |
| 3,591,191 | 7/1971 | Coderre | 260—861 |

DONALD E. CZAJA, Primary Examiner

R. W. GRIFFIN, Assistant Examiner

U.S. Cl. X.R.

8—DIG. 4; 260—31.6, DIG. 15, DIG. 21